United States Patent
Lemmer et al.

(10) Patent No.: US 12,281,993 B2
(45) Date of Patent: Apr. 22, 2025

(54) HIGH RESOLUTION CONTINUOUS ROTATION INDUSTRIAL RADIOGRAPHY IMAGING PROCESSES

(71) Applicant: ILLINOIS TOOL WORKS INC., Glenview, IL (US)

(72) Inventors: Camaron Mitchell Lemmer, Saint Michael, MN (US); Brett Aaron Muehlhauser, Prior Lake, MN (US); Shaun Peter Coughlin, Elk River, MN (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 210 days.

(21) Appl. No.: 17/897,396

(22) Filed: Aug. 29, 2022

(65) Prior Publication Data
US 2023/0083059 A1 Mar. 16, 2023

Related U.S. Application Data

(60) Provisional application No. 63/244,329, filed on Sep. 15, 2021.

(51) Int. Cl.
*G01N 23/04* (2018.01)
*G06T 3/4053* (2024.01)

(52) U.S. Cl.
CPC ........... *G01N 23/04* (2013.01); *G06T 3/4053* (2013.01); *G01N 2223/3306* (2013.01); *G01N 2223/40* (2013.01)

(58) Field of Classification Search
CPC ........... G01N 23/04; G01N 2223/3306; G01N 2223/40; G06T 3/40; G06T 3/4053; G06T 11/005; G06T 2200/24
See application file for complete search history.

(56) References Cited

U.S. PATENT DOCUMENTS

| | | | |
|---|---|---|---|
| 7,136,454 B2 | 11/2006 | Gerndt et al. | |
| 9,459,217 B2 | 10/2016 | Wang et al. | |
| 10,247,682 B2 | 4/2019 | Schlecht et al. | |
| 2012/0257713 A1 | 10/2012 | Noel et al. | |

OTHER PUBLICATIONS

International Searching Authority, Search Report and Written Opinion, Application No. PCT/US2022/075641, mailed Nov. 25, 2022, 17 pages.
Martz et al., "Computed Tomography Systems and their Industrial Applications," Appl. Radiat. Isot. vol. 41, No. 10/11, 1990, 19 pages.
Bruandet et al., "Improving X-ray images resolution using subpixel shifts of the detector," part of the SPIE conference on Image Processing, San Diego, CA Feb. 1999, SPIE vol. 3661, 11 pages.

*Primary Examiner* — Jurie Yun
(74) *Attorney, Agent, or Firm* — McAndrews, Held & Malloy, Ltd.

(57) ABSTRACT

Described herein are examples of industrial radiography systems that may control, or recommend, certain parameter values of a high resolution, continuous rotation, radiographic imaging process. By controlling, or recommending, the particular parameter values, it may be possible to mitigate certain synchronization issues that occur during the high resolution, continuous rotation, radiographic imaging process. With the synchronization issues mitigated, a user may be able to perform the high resolution, continuous rotation, radiographic imaging process at a high speed, without the loss of detail and/or blur that sometimes occurs due to the synchronization issues.

18 Claims, 6 Drawing Sheets

HIGH RESOLUTION CONTINUOUS ROTATION INDUSTRIAL RADIOGRAPHY IMAGING PROCESSES

CROSS REFERENCE TO RELATED APPLICATIONS

The present application claims priority to U.S. Provisional Application No. 63/244,329, filed Sep. 15, 2021, entitled "HIGH RESOLUTION CONTINUOUS ROTATION INDUSTRIAL RADIOGRAPHY IMAGING PROCESSES," the entire contents of which are hereby incorporated by reference.

TECHNICAL FIELD

The present disclosure generally relates to industrial radiography imaging processes and, more particularly, to high resolution, continuous rotation, industrial radiography imaging processes.

BACKGROUND

Industrial radiography imaging systems are used to acquire two dimensional (2D) radiographic images of parts used in industrial applications. Such industrial applications might include, for example, aerospace, automotive, electronic, medical, pharmaceutical, military, and/or defense applications. The 2D radiographic images may be inspected to check the part(s) for cracks, flaws, and/or defects that may or may not normally be visible to the human eye.

Limitations and disadvantages of conventional and traditional approaches will become apparent to one of skill in the art, through comparison of such systems with the present disclosure as set forth in the remainder of the present application with reference to the drawings.

BRIEF SUMMARY

The present disclosure is directed to high resolution, continuous rotation, industrial radiography imaging processes, substantially as illustrated by and/or described in connection with at least one of the figures, and as set forth more completely in the claims.

These and other advantages, aspects and novel features of the present disclosure, as well as details of an illustrated example thereof, will be more fully understood from the following description and drawings.

Figure 1:
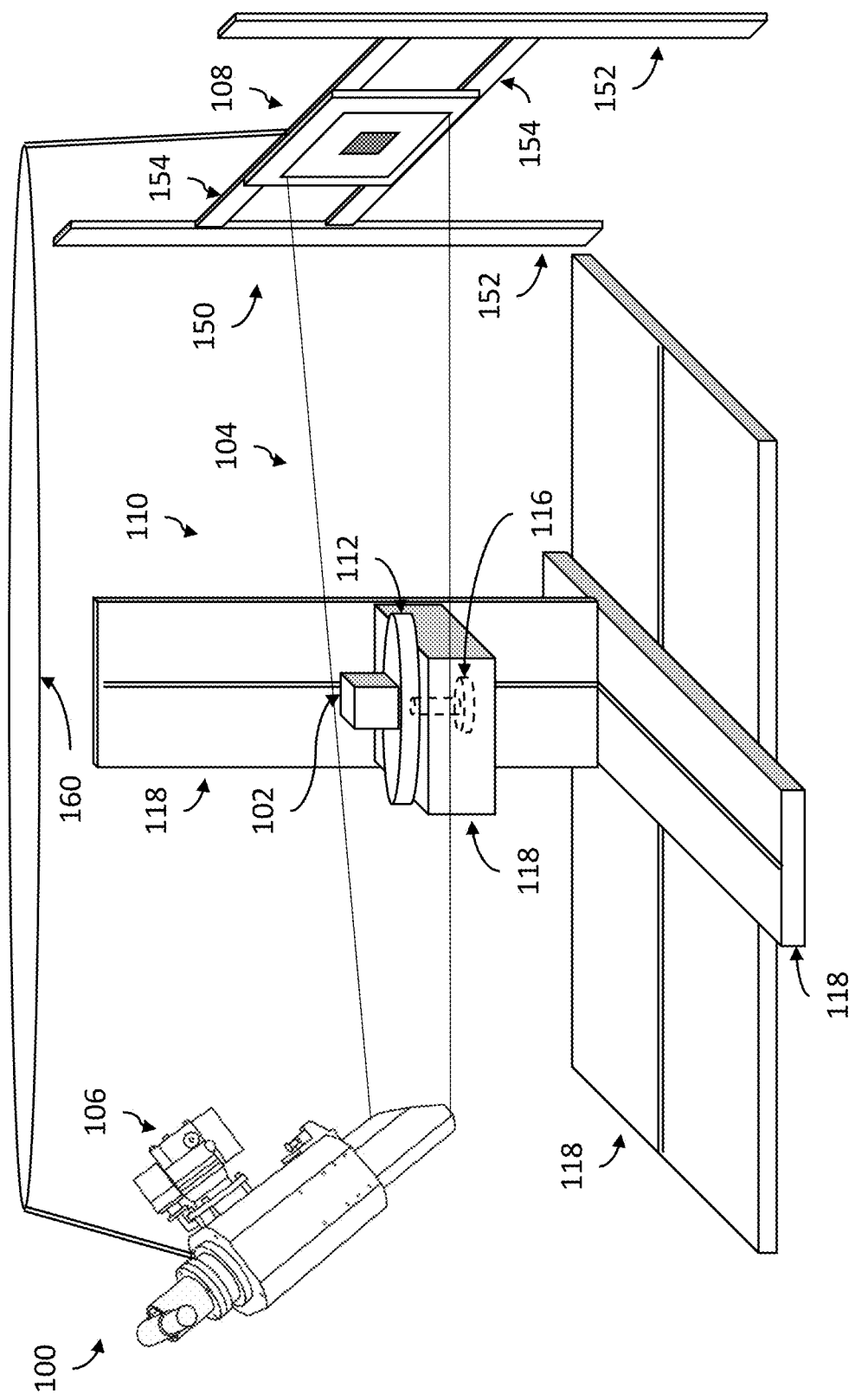
FIG. 1 shows an example of an industrial X-ray radiography machine, in accordance with aspects of this disclosure.

The figures are not necessarily to scale. Where appropriate, the same or similar reference numerals are used in the figures to refer to similar or identical elements. For example, reference numerals utilizing lettering (e.g., grid 402a, grid 402b) refer to instances of the same reference numeral that does not have the lettering (e.g., grids 402).

DETAILED DESCRIPTION

Some examples of the present disclosure relate to industrial radiography systems that control, or recommend, certain parameter values of a high resolution, continuous rotation, radiographic imaging process. By controlling, or recommending, the particular parameter values, it may be possible to mitigate certain synchronization issues that occur during the high resolution, continuous rotation, radiographic imaging process. With the synchronization issues mitigated, a user may be able to perform the high resolution, continuous rotation, radiographic imaging process at a high speed, without the loss of detail and/or added blur that sometimes occurs due to the synchronization issues.

Some examples of the present disclosure relate to a non-transitory computer readable medium comprising machine readable instructions which, when executed by a processor, cause the processor to: receive, via an input device of a user interface, a selection of a continuous high resolution image acquisition process that acquires radiographic images of an object at a plurality of different detector positions of a radiation detector while the object is being rotated; in response to the selection, identify a maximum starting angle variation, the maximum starting angle variation comprising a maximum tolerable difference between an orientation of the object when a first initial image is acquired and the orientation of the object when a second initial image is acquired during the high resolution image acquisition process, the first initial image being acquired when the radiation detector is at a first detector position during the high resolution image acquisition process, and the second initial image being acquired when the radiation detector is at a second detector position during the high resolution image acquisition process; set, or recommend, a first parameter value of a first parameter to be a first value, or a second parameter value of a second parameter to be a second value, based on the maximum starting angle variation; and execute the high resolution image acquisition process based on the first parameter value and the second parameter value to generate an image of the object.

In some examples, the first parameter comprises a number of image projections and the second parameter comprises a number of image frames averaged together for one image projection. In some examples, the non-transitory computer readable medium further comprises machine readable instructions for the high resolution image acquisition process which, when executed by the processing circuitry, cause the processing circuitry to: generate, while the radiation detector is at the first detector position, a first set of radiographic images based on radiation detected by the radiation detector while a rotatable fixture rotates the object through a first revolution; generate, while the radiation detector is at the second detector position, a second set of radiographic images based on radiation detected by the radiation detector while the rotatable fixture rotates the object through a second revolution; and produce a third set of higher-resolution radiographic images based on radiographic images in the first set of radiographic images and corresponding radiographs in the second set of radiographic images, the higher-resolution radiographic images having higher resolution than the radiographic images in the first set of radiographs and the corresponding radiographic images in the second set of radiographs, wherein a size of the first set, second set, or third set of radiographic images is dependent on the first parameter value of the first parameter or the second parameter value of the second parameter.

In some examples, the non-transitory computer readable medium further comprises machine readable instructions for the high resolution image acquisition process which, when executed by the processing circuitry, cause the processing circuitry to: assemble the third set of higher-resolution radiographic images into the image of the object, the image of the object comprising data representative of a two-dimensional (2D) image, data representative of a three-dimensional (3D) volume, or data representative of a 2D slice of the 3D volume. In some examples, the size of the first set and the second set of radiographic images is equal to the first parameter value multiplied by the second parameter value, and the size of the third set is equal to the first parameter value. In some examples, setting, or recommending, the first parameter value of the first parameter to be the first value, or the second parameter value of the second parameter to be the second value, based on the maximum starting angle variation comprises: determining one or more first values of the first parameter or second values of the second parameter that could result in a starting angle variation that exceeds the maximum starting angle variation, the starting angle variation comprising a difference in the orientation of the object when the first initial image of the first set of radiographic images is acquired by the radiation detector during the first revolution of the object, and the orientation of the object when a second initial image of the second set of radiographic images is acquired by the radiation detector during the second revolution of the object, and prohibiting input or selection, or recommending against input or selection, of the one or more first values of the first parameter or second values of the second parameter.

In some examples, setting, or recommending, the first parameter value of the first parameter to be the first value, or the second value of the second parameter to be the second value, based on the maximum starting angle variation further comprises automatically setting the first parameter value or the second parameter value such that the starting angle variation will not exceed the maximum starting angle variation. In some examples, the first detector position is offset from the second detector position by less than a pixel size of the radiation detector. In some examples, the non-transitory computer readable medium further comprises machine readable instructions which, when executed by the processing circuitry, cause the processing circuitry to: display the image on a display screen. In some examples, the maximum starting angle variation is identified based on a geometric magnification of the industrial radiography imaging system or an image quality necessary for a particular application of the industrial radiography imaging system, the geometric magnification comprising a first distance from the radiation emitter to the radiation detector divided by a second distance from the radiation emitter to the object.

Some examples of the present disclosure relate to an industrial radiography imaging system, comprising: a radiation emitter configured to emit radiation; a radiation detector configured to detect radiation emitted by the radiation emitter; a rotatable fixture configured to retain and rotate an object, the rotatable fixture being positioned between the radiation emitter and radiation detector; a detector positioner configured to move the radiation detector to a plurality of different detector positions; and an image acquisition system configured to generate an image of the object based on radiation detected by the radiation detector after passing through the object, the image acquisition system comprising: a user interface comprising an input device, processing circuitry, and memory circuitry comprising machine readable instructions which, when executed by the processing circuitry, cause the processing circuitry to: receive, via the input device, a selection of a continuous high resolution image acquisition process that acquires images at the plurality of different detector positions while the object is being rotated, in response to the selection, identify a maximum starting angle variation, the maximum starting angle variation comprising a maximum tolerable difference between an orientation of the object when a first initial image is acquired and the orientation of the object when a second initial image is acquired during the high resolution image acquisition process, the first initial image being acquired when the radiation detector is at a first detector position during the high resolution image acquisition process, and the second initial image being acquired when the radiation detector is at a second detector position during the high resolution image acquisition process, set, or recommend, a first parameter value of a first parameter to be a first value, or a second parameter value of a second parameter to be a second value, based on the maximum starting angle variation, and execute the high resolution image acquisition process based on the first value and the second value to generate the image of the object.

In some examples, the first parameter comprises a number of image projections and the second parameter comprises a number of image frames averaged together for one image projection. In some examples, the memory circuitry further comprises machine readable instructions for the high resolution image acquisition process which, when executed by the processing circuitry, cause the processing circuitry to: generate, while the radiation detector is at the first detector position, a first set of radiographic images based on radiation detected by the radiation detector while the rotatable fixture rotates the object through a first revolution, generate, while the radiation detector is at the second detector position, a second set of radiographic images based on radiation detected by the radiation detector while the rotatable fixture rotates the object through a second revolution, and produce a third set of higher-resolution radiographic images based on radiographic images in the first set of radiographic images and corresponding radiographs in the second set of radiographic images, the higher-resolution radiographic images having higher resolution than the radiographic images in the first set of radiographs and the corresponding radiographic images in the second set of radiographs, wherein a size of the first set, second set, or third set of radiographic images is based on the first value of the first parameter or the second value of the second parameter.

In some examples, the memory circuitry comprises machine readable instructions for the high resolution image acquisition process which, when executed by the processing circuitry, further cause the processing circuitry to: assemble the third set of higher-resolution radiographic images into the image of the object, the image of the object comprising data representative of a two-dimensional (2D) image, data representative of a three-dimensional (3D) volume, or data representative of a 2D slice of the 3D volume. In some examples, the size of the first set and the second set of radiographic images is equal to the first parameter value multiplied by the second parameter value, and the size of the third set is equal to the first parameter value. In some examples, setting, or recommending, the first parameter value of the first parameter to be the first value, or the second parameter value of the second parameter to be the second value, based on the maximum starting angle variation comprises: determining one or more first values of the first parameter or second values of the second parameter that could result in a starting angle variation that exceeds the maximum starting angle variation, the starting angle variation comprising a difference in the orientation of the object when the first initial image of the first set of radiographic images is acquired by the radiation detector during the first revolution of the object, and the orientation of the object when a second initial image of the second set of radiographic images is acquired by the radiation detector during the second revolution of the object, and prohibiting input or selection, or recommending against input or selection, of the one or more first values of the first parameter or second values of the second parameter.

In some examples, setting, or recommending, the first parameter value of the first parameter to be the first value, or the second parameter value of the second parameter to be the second value, based on the maximum starting angle variation further comprises automatically setting the first parameter value or the second parameter value such that the starting angle variation will not exceed the maximum starting angle variation. In some examples, the first detector position is offset from the second detector position by less than a pixel size of the radiation detector. In some examples, the memory circuitry further comprises machine readable instructions which, when executed by the processor: display the image of the object on a display screen of the user interface. In some examples, the maximum starting angle variation is identified based on a geometric magnification of the industrial radiography imaging system or an image quality necessary for a particular application of the industrial radiography imaging system, the geometric magnification comprising a first distance from the radiation emitter to the radiation detector divided by a second distance from the radiation emitter to the object.

FIG. 1 shows an example industrial X-ray radiography machine 100. In some examples, the X-ray radiography machine 100 may be used to perform non-destructive testing (NDT), digital radiography (DR) scans, computerized tomography (CT) scans, and/or other applications on an object 102. In some examples, the object 102 may be an industrial component and/or an assembly of components (e.g., an engine cast, microchip, bolt, etc.). In some examples, the object 102 may be relatively small, such that a finer, more detailed, higher resolution radiographic imaging process may be useful. While primarily discussed in terms of X-rays for the sake of simplicity, in some examples, the industrial X-ray radiography machines 100 discussed herein may use radiation in other wavelengths (e.g., Gamma, Neutron, etc.).

In the example of FIG. 1, the X-ray radiography machine 100 directs X-ray radiation 104 from an X-ray emitter 106, through the object 102, to an X-ray detector 108. In some examples, the X-ray emitter 106 may comprise an X-ray tube configured to emit cone or fan shaped X-ray radiation.

In some examples, the X-ray emitter 106 may emit X-ray radiation within an energy range of 20 kiloelectron volts (keV) to 10 megaelectron volts (meV).

In some examples, two dimensional (2D) digital images (e.g., radiographic images, X-ray images, etc.) may be generated based on the X-ray radiation 104 incident on the X-ray detector 108. In some examples, the 2D images may be generated by the X-ray detector 108 itself. In some examples, the 2D images may be generated by the X-ray detector 108 in combination with a computing system in communication with the X-ray detector 108.

In some examples, the 2D images may be constantly captured/acquired by the X-ray detector 108 (e.g., in a free run mode) at a given frame rate, as long as the X-ray detector 108 is powered. However, in some examples, the 2D images may only be fully generated by the X-ray detector 108 (and/or associated computing system(s)) when a scanning/imaging process has been selected and/or is running. Likewise, in some examples, the 2D images may only be saved in permanent (i.e., non-volatile) memory when a scanning/imaging process has been selected and/or is running.

In some examples, the 2D images generated by the X-ray detector 108 (and/or associated computing system(s)) may be combined to form three dimensional (3D) volumes and/or images. In some examples, 2D image slices of the 3D volumes/images may also be formed. While the term "image" is used herein as a shorthand, it should be understood that an "image" may comprise representative data until that data is visually rendered by one or more appropriate components (e.g., a display screen, a graphic processing unit, an X-ray detector 108, etc.).

In some examples, the X-ray detector 108 may comprise a flat panel detector (FDA), a linear diode array (LDA), and/or a lens-coupled scintillation detector. In some examples, the X-ray detector 108 may comprise a fluoroscopy detection system and/or a digital image sensor configured to receive an image indirectly via scintillation. In some examples, the X-ray detector 108 may be implemented using a sensor panel (e.g., a charge coupled device (CCD) panel, a complementary metal-oxide-semiconductor (CMOS) panel, etc.) configured to receive the X-rays directly, and to generate the digital images. In some examples, the X-ray detector 108 may include a scintillation layer/screen that absorbs X-rays and emits visible light photons that are, in turn, detected by a solid-state detector panel (e.g., a CMOS X-ray panel and/or CCD X-ray panel) coupled to the scintillation screen.

Figure 4:
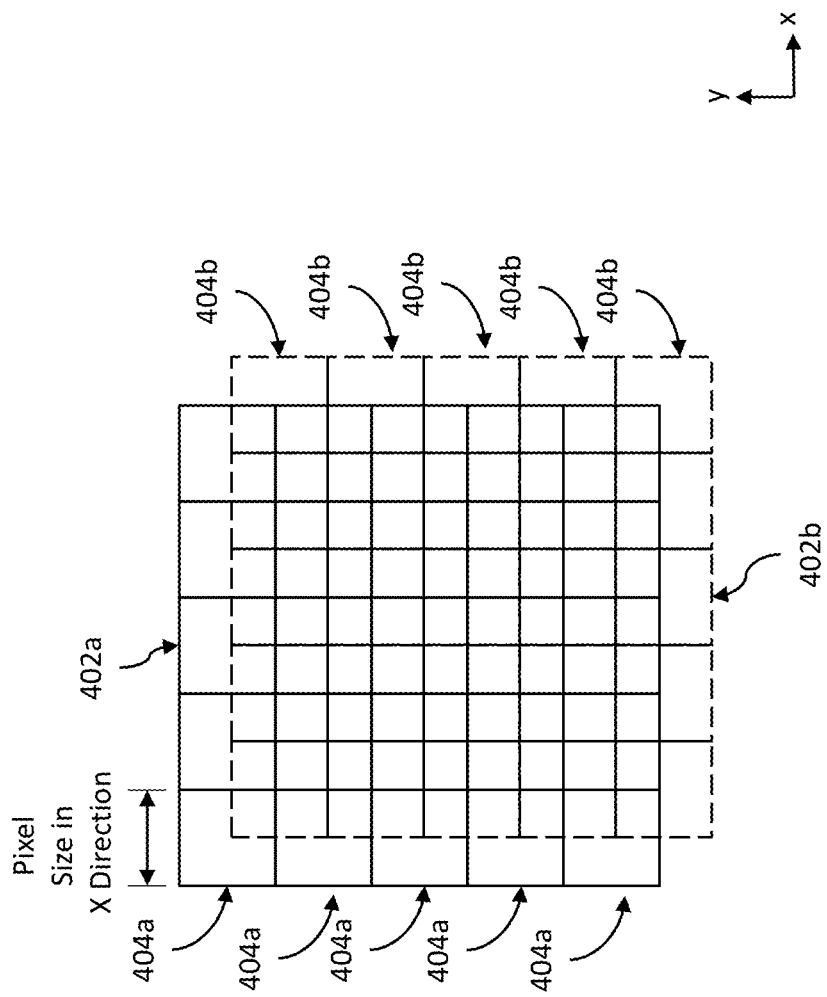
FIG. 4 illustrates how different images, captured at different (e.g., sub-pixel shifted) X-ray detector positions, could be combined to produce a single higher resolution image, in accordance with aspects of this disclosure.

In some examples, the X-ray detector 108 (e.g., the solid state detector panel) may include pixels 404 (see, e.g., FIG. 4). In some examples, the pixels 404 may correspond to portions of a scintillation screen. In some examples, the size of each pixel 404 may range from tens to hundreds of micrometers. In some examples, the pixel size of the X-ray detector 108 may be in the range of 25 micrometers to 250 micrometers (e.g., 200 micrometers).

In some examples, the 2D image captured by the X-ray detector 108 (and/or associated computing system) may contain features finer (e.g., smaller, denser, etc.) than the pixel size of the X-ray detector 108. For example, a computer microchip may have very fine features that are smaller than a pixel 404. In such examples, it may be useful to use sub-pixel sampling to achieve a higher, more detailed, resolution than might otherwise be possible.

For example, multiple 2D images of the object 102 may be captured while the object 102 is at the same orientation and the X-ray detector 108 is at either of two (or more) different positions. In some examples, the different positions of the X-ray detector 108 may be offset from one another by less than the size of a pixel 404 (i.e., a sub-pixel). The multiple sub-pixel shifted 2D images may then be combined (e.g., via an interlacing technique) to form a single higher resolution 2D image of the object 102 at that orientation. Thus, when the term "high resolution imaging process" is used herein, it may refer to an imaging process (e.g., radiography, computed tomography, etc.) in which sub-pixel sampling is used to ensure the resolution (and/or pixel density) of the final image is greater than the resolution (and/or pixel density) of the X-ray detector 108 (and/or portion of the X-ray detector 108 and/or virtual detector) used to capture the image. While it may be possible to instead translate the object 102, rather than the X-ray detector 108, for sub-pixel sampling, moving the object 102 may also alter the imaging geometry, which may negatively impact the resulting combination of images.

FIG. 4 illustrates the concept of using different images from different (e.g., sub-pixel shifted) positions of the X-ray detector 108 to form a single higher resolution image. As shown, the figure depicts two different grids 402 of pixels 404, indicating two different positions of the X-ray detector 108 that are offset from one another by less than the size of a pixel 404. The first grid 402a of pixels 404a is depicted using solid lines, while a second grid 402b of pixels 404b is depicted using dashed lines. As shown, the position of grid 402b is offset from the position of grid 402a by a half pixel 404 in the positive x direction and a half pixel in the negative y direction (resulting in an offset of less than a pixel 404 in the diagonal direction).

In the example of FIG. 4, the smaller squares formed by the overlapping pixels 404 are indicative of how the pixels 404 of the two grids 402 could be combined to increase the resolution beyond that of the pixel 404 (e.g., to that of a sub-pixel). Additional description of the concept may be found in U.S. Pat. No. 9,459,217, entitled "High-Resolution Computed Tomography," and having a § 371 date of Sep. 30, 2015, the entire contents of which are hereby incorporated by reference. While two grids 402 are shown to represent two positions for the sake of simplicity of clarity, in some examples, the X-ray detector 108 may be moved to four, six, eight, and/or more positions during sub-pixel sampling.

In the example of FIG. 1, the X-ray machine 100 includes a detector positioner 150 configured to move the X-ray detector 108 to different detector positions (e.g., for sub-pixel sampling). As shown, the detector positioner 150 includes two parallel pillars 152 connected by two parallel rails 154. As shown the X-ray detector 108 is retained on the rails 154. In some examples, the X-ray detector 108 may be retained on (and/or attached to) the rails 154 by one or more intermediary supports.

In some examples, the detector positioner 150 may be configured to move the X-ray detector 108 along the rails 154 toward and/or away from either pillar 152. In some examples, the rails 154 may be configured to move (e.g., up and/or down) along and/or parallel to the pillars 152, thereby also moving the X-ray detector 108 along and/or parallel to the pillars 152. While illustrated simply in the example of FIG. 1, in some examples, the detector positioner 150 may be more complex, similar to the x translation stage 18, y translation stage 20, detector mounting frame 26, and/or x/y stage linear encoders 22/24 shown and described in U.S. Pat. No. 9,459,217, entitled "High-Resolution Computed Tomography," and having a § 371 date of Sep. 30, 2015, the entire contents of which are hereby incorporated by reference.

As the X-ray detector 108 may be moved by the detector positioner 150, in some examples, the object 102 may be moved by an object positioner 110. In the example of FIG. 1, the object positioner 110 retains the object 102 in the path of the X-ray radiation 104, between the X-ray emitter 106 and detector 108. In some examples, the object positioner 110 may be configured to move the object 102 towards and/or away from the X-ray emitter 106 and/or X-ray detector 108, thereby changing the geometric magnification (defined as the distance between the X-ray emitter 106 and the X-ray detector 108 divided by the distance between the X-ray emitter 106 and the object 102). In some examples, the object positioner 110 may be configured to move and/or rotate the object 102 so that a desired portion and/or orientation of the object 102 is located in the path of the X-ray radiation 104. In some examples, the object positioner 110 may position the object 102 at different angles/orientations with respect to the X-ray emitter 106 and/or X-ray detector 108 in order to obtain 2D images at different orientations, which may then be used to generate one or more three dimensional (3D) images of the object 102.

In the example of FIG. 1, the object positioner 110 includes a rotatable fixture 112 upon which the object 102 is positioned. As shown, the rotatable fixture 112 is a circular plate. As shown, the rotatable fixture 112 is attached to a motorized spindle 116, through which the rotatable fixture 112 may be rotated about an axis defined by the spindle 116. In some examples, one or more alternative and/or additional rotation mechanisms may be provided.

In the example of FIG. 1, the rotatable fixture 112 is supported by a support structure 118. In some examples, the support structure 118 may be configured to translate the rotatable fixture 112 (and/or the object 102) toward and/or away from the X-ray emitter 106 and/or the X-ray detector 108. In some examples, the support structure 118 may include one or more actuators configured to impart the translation(s).

While one example object positioner 110 is shown in the example of FIG. 1, in some examples a different object positioner 110 may be used. For example, a robotic object positioner may be used to translate and/or rotate the object 102. Likewise, while shown as a circular plate in the example of FIG. 1, in some examples, the rotatable fixture 112 may instead comprise a different fixture, such as, for example, a clamp, clasp, gripper, and/or other retention mechanism. In some examples, the X-ray emitter 106 and the X-ray detector 108 may instead be rotated around the object 102, rather than (or in addition to) the object 102 being rotated by the rotatable fixture 112 (as might be helpful if the object 102 is cumbersome, for example).

In the example of FIG. 1, the X-ray machine 100 further includes a rotatable platform 160 configured to move the X-ray emitter 106 and the X-ray detector 108 around the object 102. In the example of FIG. 1, the rotatable platform 160 is shown elevated above, and connected to, the X-ray emitter 106 and the X-ray detector 108, such as might occur when implemented using a gantry system, for example.

In some examples, the rotatable platform 160 may instead be differently implemented, such as via a platform built into a floor of the X-ray machine 100, one or more robotic movers, a conveyor, and/or one or more other appropriate means. In some examples, the rotatable platform 160 may be configured for rotation around a different (e.g., horizontal, diagonal, etc.) axis, with the X-ray emitter 106 and/or the X-ray detector 108 repositioned accordingly.

In some examples, one or more portions of object positioner 118 (e.g., the support structure 118) may be altered and/or omitted to facilitate use (e.g. line of sight) X-ray emitter 106 and the X-ray detector 108 when moved around the object 102 by the rotatable platform 160. In some examples, the rotatable platform 160 may be configured to maintain the same geometric magnification of the X-ray machine 100 when moving the X-ray emitter 106 and the X-ray detector 108 around the object 102.

Figure 2:
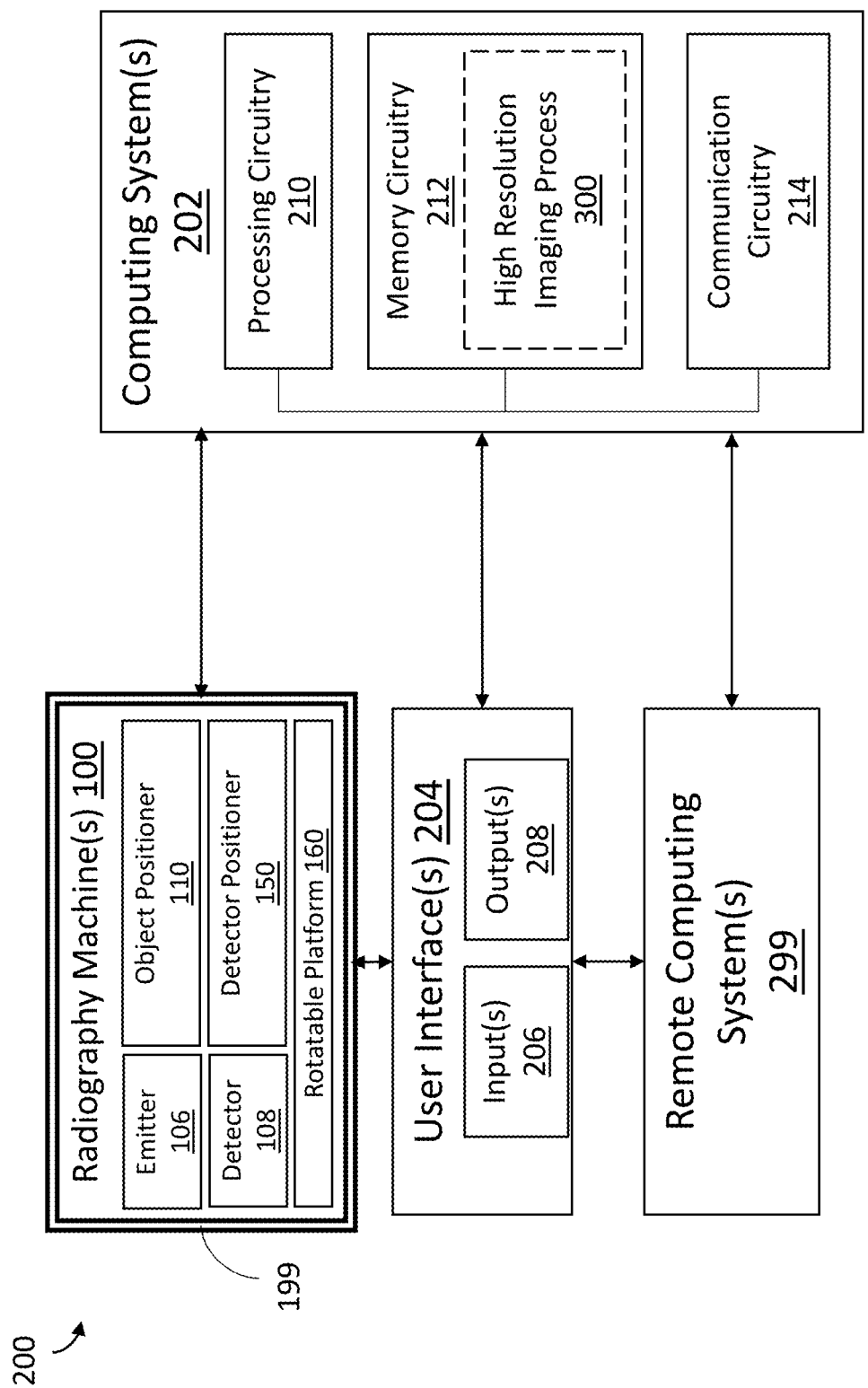
FIG. 2 is a block diagram showing an example X-ray radiography system having the industrial X-ray radiography machine of FIG. 1, in accordance with aspects of this disclosure.

FIG. 2 shows an example of an X-ray radiography system 200 that includes an X-ray radiography machine 100, such as, for example, the X-ray radiography machine 100 shown in FIG. 1. As shown, the X-ray radiography system 200 also includes a computing system 202, a user interface (UI) 204, and a remote computing system 299. While only one X-ray radiography machine 100, computing system 202, UI 204, and remote computing system 299 are shown in the example of FIG. 2, in some examples the X-ray radiography system 200 may include several X-ray radiography machines 100, computing systems 202, UIs 204, and/or remote computing systems 299.

In the example of FIG. 2, the X-ray radiography machine 100 has an emitter 106, detector 108, detector positioner 150, and object positioner 110 enclosed within a housing 199. As shown, the X-ray radiography machine 100 is connected to and/or in communication with the computing system(s) 202 and UI(s) 204. In some examples, the X-ray radiography system 100 may also be in electrical communication with the remote computing system(s) 299. In some examples, the communications and/or connections may be electrical, electromagnetic, wired, and/or wireless.

In the example of FIG. 2, the UI 204 includes one or more input devices 206 and/or output devices 208. In some examples, the one or more input devices 206 may comprise one or more touch screens, mice, keyboards, buttons, switches, slides, knobs, microphones, dials, and/or other electromechanical input devices. In some examples, the one or more output devices 208 may comprise one or more display screens, speakers, lights, haptic devices, and/or other devices. In some examples, a user may provide input to, and/or receive output from, the X-ray radiography machine(s) 100, computing system(s) 202, and/or remote computing system(s) 299 via the UI(s) 204.

In some examples, the UI(s) 204 may be part of the computing system 202. In some examples, the computing system 202 may implement one or more controllers of the X-ray radiography machine(s) 100. In some examples, the computing system 202 together with the UI(s) 204 may comprise an image acquisition system of the X-ray radiography system 200. In some examples, the remote computing system(s) 299 may be similar or identical to the computing system 202.

In the example of FIG. 2, the computing system 202 is in (e.g., electrical) communication with the X-ray radiography machine(s) 100, UI(s) 204, and remote computing system(s) 299. In some examples, the communication may be direct communication (e.g., through a wired and/or wireless medium) or indirect communication, such as, for example, through one or more wired and/or wireless networks (e.g., local and/or wide area networks). As shown, the computing system 202 includes processing circuitry 210, memory circuitry 212, and communication circuitry 214 interconnected with one another via a common electrical bus.

In some examples, the processing circuitry 210 may comprise one or more processors. In some examples, the communication circuitry 214 may include one or more wireless adapters, wireless cards, cable adapters, wire adapters, radio frequency (RF) devices, wireless communication devices, Bluetooth devices, IEEE 802.11-compliant devices, WiFi devices, cellular devices, GPS devices, Ethernet ports, network ports, lightning cable ports, cable ports, etc. In some examples, the communication circuitry 214 may be configured to facilitate communication via one or more wired media and/or protocols (e.g., Ethernet cable(s), universal serial bus cable(s), etc.) and/or wireless mediums and/or protocols (e.g., near field communication (NFC), ultra high frequency radio waves (commonly known as Bluetooth), IEEE 802.11x, Zigbee, HART, LTE, Z-Wave, WirelessHD, WiGig, etc.).

In the example of FIG. 2, the memory circuitry 212 comprises and/or stores a high resolution imaging process 300. In some examples, the high resolution imaging process 300 may be implemented via machine readable (and/or processor executable) instructions stored in memory circuitry 212 and/or executed by the processing circuitry 210. In some examples, the high resolution imaging process 300 may execute as part of a larger scanning and/or imaging process of the X-ray radiography system 200.

In some examples, the high resolution imaging process 300 may execute in response to a user selection of a high resolution (e.g., sub-pixel) imaging/scanning process that generates and/or stores images while the object 102 is being continuously rotated (e.g., via the object positioner 110). In some examples, the high resolution imaging process 300 may address synchronization issues that may occur during such high resolution, continuous rotation, imaging processes. This may be distinguished from a more conventional high resolution (e.g., sub-pixel) imaging process that generates and/or stores images in a step wise fashion after the object 102 has been rotated (e.g., while the object 102 is at rest), where synchronization may not be an issue.

In particular, the high resolution imaging process 300 may provide solutions to mitigate issues with synchronizing the beginning of image capture/generation with the beginning of rotation of the object 102. In some examples, it may be difficult to synchronize the beginning of image capture/generation with the beginning of rotation of the object 102, at least because the X-ray detector 108 may always be capturing images. Due to the synchronization issues, the initial image that is captured/generated during the scan may be captured/generated at (what the scanning process considers) some non-zero degree of rotation.

Further, because the rotation of the object 102 is continuous, this variation in rotational angle may cascade across all the images of the set of images that are captured/generated while the X-ray detector 108 is at a given position. Moreover, the same synchronization issue and/or angular variation may occur each time the X-ray detector 108 is shifted to a different position (since it takes some time to shift to a different position and then begin rotating and capturing images again). Thus, the orientation angle of the object 102 may be different in the first/initial images (and corresponding subsequent images) of different image sets (captured/generated at different positions of the X-ray detector 108). This angular variation of the object 102 in, what were supposed to be, angularly aligned images of the object, may result in lower image quality, loss of detail, lower sharpness, blurring, and/or other negative consequences when the images are combined into (what was supposed to be) a higher resolution image.

While much of this disclosure discusses rotating the object 102 during the high resolution imaging process 300, in some examples, the X-ray emitter 106 and the X-ray detector 108 may instead be rotated around the object 102, as discussed above. However, angular variation remains an issue even in such examples.

Figure 5B:
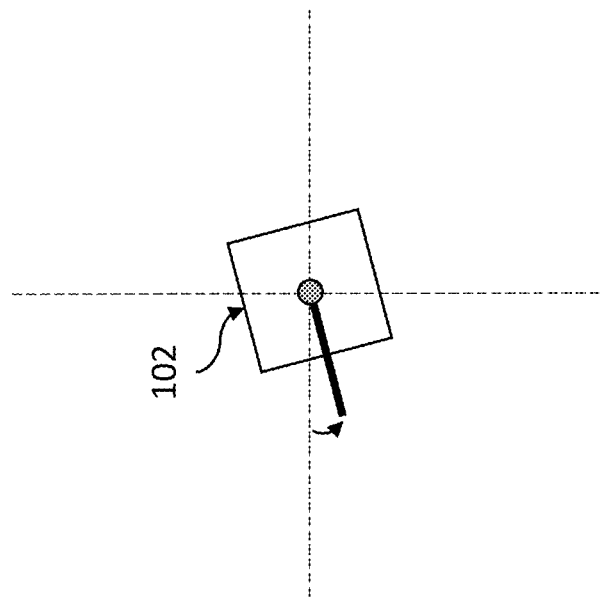
FIGS. 5a-5b illustrate the concept of an angular variation introduced due to lack of synchronization between a beginning of rotation of an object and a beginning of image capture of the object, in accordance with aspects of this disclosure.
Figure 5A:
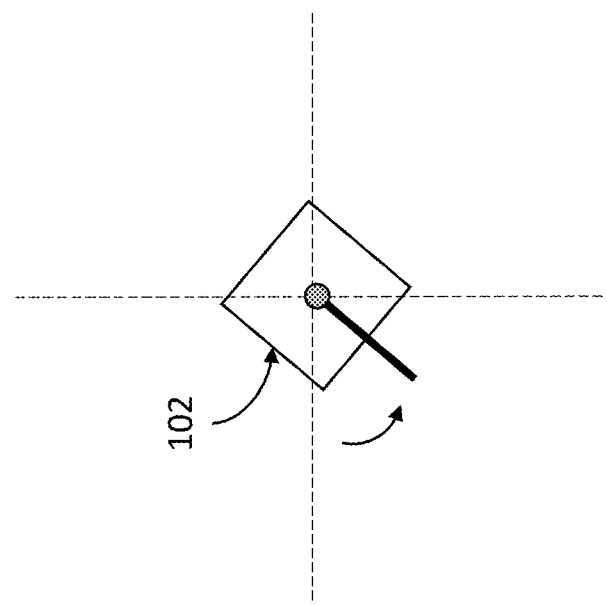

FIGS. 5a-5b illustrate an example of this angular variation. The figures show a top down view of a rectangular object 102 when a first/initial image is captured/generated for two different sets of images (e.g., with different positions of the X-ray detector 108). FIG. 5a is representative of the angular orientation of the object 102 (e.g., with respect to the X-ray emitter 106 and/or X-detector 108) when the X-ray detector 108 is at a first position. FIG. 5b is representative of the position of the object 102 when the X-ray detector 108 is at a second (e.g., slightly shifted) position. The dashed crosshairs indicate both a center of the object 102 and the angles of 0, 90, 180, and 270 degrees. The dark black line extending from the center of the object 102 is used as a visual aid to make the angle of rotation clearer.

In the example of FIG. 5a, the object 102 has been rotated beyond the 0 degree dotted line at initial image capture. In the example of FIG. 5b, the object has also been rotated beyond the 0 degree dotted line at initial image capture. However, the angle of rotation of the object 102 is not the same in FIGS. 5a and 5b. Rather, the object 102 has been rotated to a larger angle in FIG. 5a than in FIG. 5b. Thus, the corresponding images will show the object 102 at two different angles, and the high resolution image formed from a combination of the two images (and all subsequent images) may be negatively impacted, as discussed above.

The difference in angle between objects 102 in corresponding images of any two image sets could potentially be as big as (but no bigger than) the largest angle to which the object 102 could be rotated at/before the first/initial image in a set is captured. This potential starting angle variation is directly correlated with the rotation speed of the object 102. The faster the object is rotated, the larger the potential starting angle variation, and vice versa.

Interestingly, the frame rate has no impact one way or the other on the potential starting angle variation. It might seem like the potential starting angle variation should be inversely correlated with frame rate. After all, the faster an image is captured, the less time there is for the object 102 to rotate beyond the starting angle before an image is captured. So one might think a larger frame rate should correlate with a lower potential starting angle variation. However, in a high resolution (e.g., sub-pixel), continuous rotation, scan, the speed of rotation is also directly correlated with the frame rate. Since the potential starting angle variation is directly correlated with the speed of rotation (which is directly correlated with frame rate), and the potential starting angle variation is also inversely correlated with frame rate, the frame rate terms cancel out, and have no impact one way or the other.

The parameters that do impact the potential starting angle variation are the number of image projections to be captured at a particular position of the X-ray detector 108, and the number of image frames that are averaged together to produce a single image projection.

As used herein, an "image projection" refers to a single image of an object 102 (at a given orientation of the object 102) that is projected onto the X-ray detector 108 (due to radiation 104 that travels from the X-ray emitter 106, through the object 102, and into/onto the X-ray detector 108), and thereafter saved in memory circuitry 212. However, in order to increase the signal to noise ratio in a single image projection, several image frames (e.g., captured while the object 102 is rotating to its image projection orientation) are sometimes averaged together to produce a single image projection. Thus, the total number of images captured during a single (partial or complete) revolution of the object 102 (at one position of the X-ray detector 108) during a continuous rotation high resolution (e.g., sub-pixel) scan is equal to the number of image projections to be captured multiplied by the number of images that are averaged together for a single image projection. These parameters will be referred to hereinafter as the image projections and frames averaged parameters.

Using the image projections and frames averaged parameter values, the rotation speed (and potential starting angle variation) of the object 102 can be calculated. In particular, the rotation speed can be calculated as the degrees of rotation (e.g., 270, 360, etc.), divided by the total number of images to be captured (i.e., number of image projections×the number of frames averaged), multiplied by the frame rate (i.e., rotation speed=degrees per image frame×image frames per second=degrees per second). The potential starting angle variation can then be calculated as the rotation speed multiplied by the time to capture one image frame (i.e., rotation speed×(1/frame rate)). However, as the frame rate is also part of the rotation speed, the frame rate drops out of the potential starting angle variation equation. By reduction, the potential starting angle variation is equal to the degrees of rotation divided by the total number of images to be captured (i.e., potential starting angle variation=degrees of rotation/(number of image projections×the number of frames averaged)).

Furthermore, it has been discovered that the negative impact of the potential starting angle variation can be mitigated if the potential starting angle variation is kept below a certain maximum starting angle variation. While it would be safest to keep the potential starting angle variation to a minimum, the potential starting angle variation is directly correlated with rotation speed; so keeping the potential starting angle variation as low as possible would also mean keeping the rotation speed as slow as possible. Additionally, one of the primary advantages of the high resolution continuous rotation scan is the increased speed of the scan, as compared to the high resolution step rotation scan. Thus, the high resolution imaging process 300 disclosed herein and discussed below controls (and/or strongly suggests) the values used for the image projections and frames averaged parameters, to ensure that both adequate speed and image quality are obtained.

Some of the disclosure below discusses the high resolution imaging process 300 performing certain actions. In some examples, this is used as a shorthand for one or more components of the X-ray radiography system 200 (e.g., processing circuitry 210, communication circuitry 214, UI 204, radiography machine 100, etc.) performing the action(s) as part of the high resolution imaging process 300.

Figure 3:
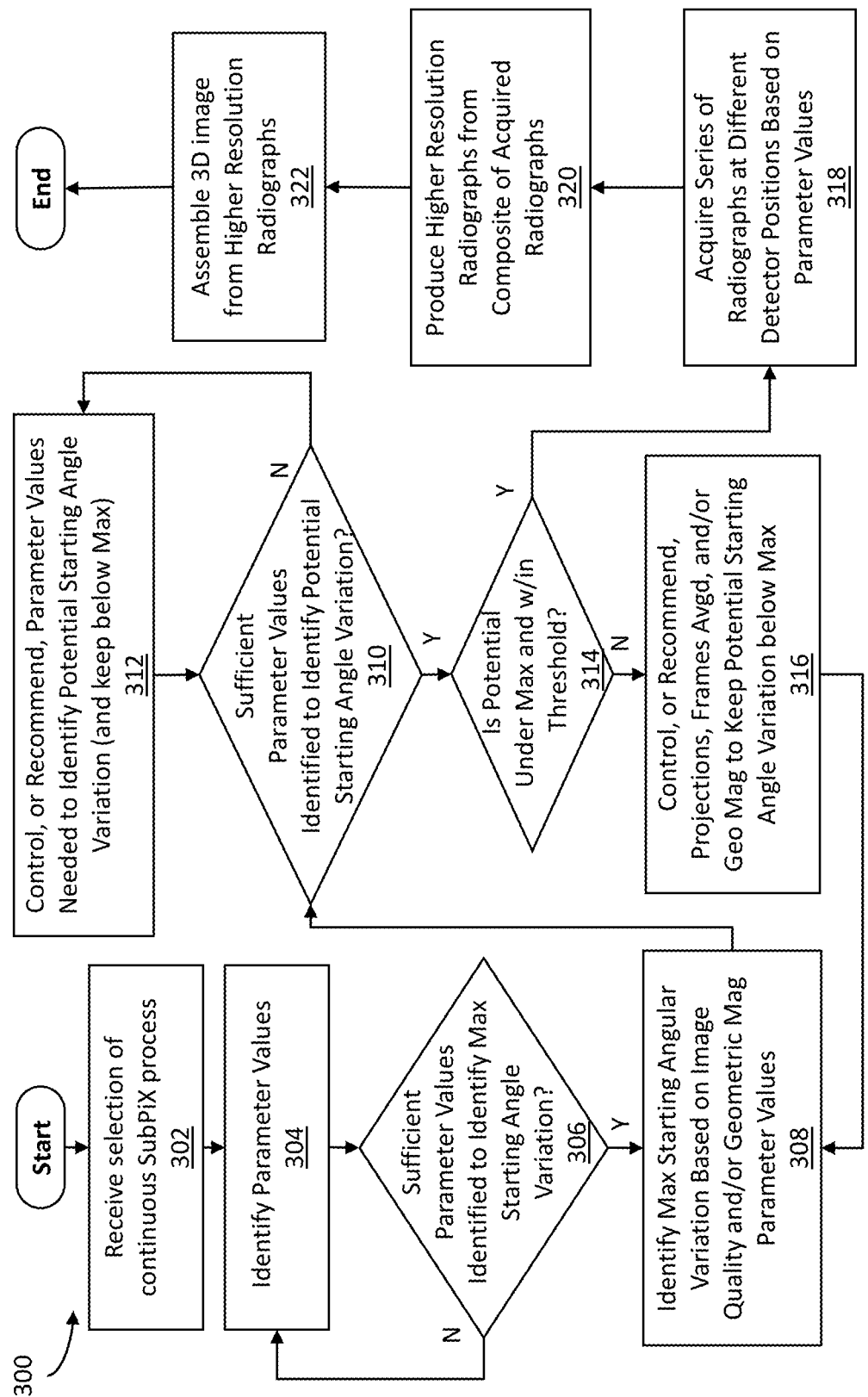
FIG. 3 is a flowchart illustrating example operation of a high resolution imaging process of the X-ray radiography system of FIG. 2, in accordance with aspects of this disclosure.

FIG. 3 is a flowchart illustrating example operation of the high resolution imaging process 300. In the example of FIG. 3, the high resolution imaging process 300 begins at block 302. At block 302, the high resolution imaging process 300 receives an input (e.g., from the input device(s) 206 of the UI 204) representative of a selection of a continuous rotation high resolution (e.g., sub-pixel) scan. While shown as part of the high resolution imaging process 300 in the example of FIG. 3 for the purposes of completeness, in some examples, block 302 may be part of a more general scanning process that executes the high resolution imaging process 300 in response to the selection of block 302. In the example of FIG. 3, the high resolution imaging process 300 proceeds to block 304 after block 302.

At block 304, the high resolution imaging process 300 identifies one or more of the parameter values that will impact a potential starting angle variation and/or maximum starting angle variation. While other parameter values (e.g., the ramp up time to reach rotation speed, the number of different positions of the X-ray detector 108, the (e.g., sub-pixel) distance between different positions of the X-ray detector 108, etc.) may also be identified at block 304 (and/or other blocks), the disclosure focuses on parameter values that will impact a potential starting angle variation and/or maximum starting angle variation. In some examples, the parameter values that will impact a potential starting angle variation and/or maximum starting angle variation may include values for image projections, frames averaged, degree of rotation (e.g., between 1-360, inclusive), geometric magnification, and a level of detail (and/or image quality) required for the particular scanning application. In some examples, the high resolution imaging process 300 may prompt the user for one or more of the parameter values, such as, for example, via one or more fields of a graphical user interface (GUI) 604 (see, e.g., FIG. 6).

In some examples, the high resolution imaging process 300 may automatically identify one or more of the parameter values. For example, the high resolution imaging process 300 may automatically identify the geometric magnification of the X-ray radiography machine 100 (e.g., based on an analysis of a test image captured via the X-ray radiography machine 100, an analysis of radiation detected by the X-ray detector 108, one or more position/distance/proximity sensors of the industrial radiography machine, etc.).

In some examples, the high resolution imaging process 300 may identify one or more of the parameter values based on one or more other parameter values. For example, the high resolution imaging process 300 may identify an ideal (and/or default) geometric magnification value based on the level of detail (and/or image quality) required, such as through a data structure (e.g., look up table, database) stored in memory circuitry 212, and/or dynamic algorithmic calculation. In the example of FIG. 3, the high resolution imaging process 300 proceeds to block 306 after block 308.

At block 308 the high resolution imaging process 300 determines whether sufficient parameter values were identified at block 304 to identify a maximum starting angle variation. In some examples, the high resolution imaging process 300 may need to identify at least a level of detail (and/or image quality) and a geometric magnification in order to determine a maximum starting angle variation. However, as discussed above, a geometric magnification may be determined based on the identified level of detail (and/or image quality). Thus, in some examples, the high resolution imaging process 300 may determine sufficient parameter values were identified if at least the level of detail (and/or image quality) value was identified at block 304.

In the example of FIG. 3, the high resolution imaging process 300 returns to block 304 if sufficient parameter values were not identified at block 304. However, if sufficient parameter values were identified at block 304 to enable determination of a maximum starting angle variation, the high resolution imaging process 300 proceeds to block 308.

At block 308, the high resolution imaging process 300 identifies a maximum starting angle variation based on the necessary level of detail (and/or image quality) and the geometric magnification. As used herein, the maximum starting angle variation refers to a maximum threshold potential starting angle variation that will still allow for the captured image to have the necessary level of detail (and/or image quality).

In some examples, the memory circuitry 212 may store a look up table, database table, and/or other data structure that maps values for geometric magnification and/or level of detail (and/or image quality) to values for maximum starting angle variation (e.g., determined experimentally for various different detail levels and/or geometric magnifications). In such examples, the high resolution imaging process 300 may determine a value for maximum starting angle variation at block 308 based on the data structure mapping, and the identified values for geometric magnification and level of detail (and/or image quality).

In some examples, the maximum starting angle variation may be determined via one or more proprietary algorithms. In such examples, the high resolution imaging process 300 may dynamically determine and/or calculate a value for maximum starting angle variation at block 308 based on the one or more proprietary algorithms and the identified values for geometric magnification and/or level of detail (and/or image quality). In the example of FIG. 3, the high resolution imaging process 300 proceeds to block 310 after block 308.

At block 310, the high resolution imaging process 300 determines whether sufficient parameter values were identified at block 304 to identify a potential starting angle variation. In some examples, the high resolution imaging process 300 may need to identify at least parameter values for the image projections, frames averaged, and degrees rotated parameters in order to identify the potential starting angle variation. In the example of FIG. 3, the high resolution imaging process 300 proceeds to block 312 if there are not sufficient parameter values to identify the potential starting angle variation.

At block 312, the high resolution imaging process 300 may control, or recommend, parameter values for the parameters (e.g., image projections, frames averaged, and degrees rotated) needed to identify the potential starting angle variation. In some examples, the operation at block 312 may depend upon how many (and/or which) parameter values have already been set (or not set). If only one needed parameter remains unset, then, in some examples, the high resolution imaging process 300 may control, or recommend, the parameter to have a parameter value that will result in a potential starting angle variation that is equal to the maximum starting angle variation, or below and within a threshold of the maximum starting angle variation.

In some examples, the high resolution imaging process 300 may control, or recommend, the parameter to have a parameter value that will result in a potential starting angle variation that is as large as possible without exceeding the maximum starting angle variation. In some examples, the high resolution imaging process 300 may prohibit, or recommend against, a parameter value that would result in a potential starting angle variation more than a threshold amount below the maximum starting angle variation (e.g., in order to maintain an adequate rotation/scan speed). In some examples, the high resolution imaging process 300 may determine the parameter value based on the other identified parameter values and the potential starting angle variation equation (discussed above), or a data structure (e.g., look up table, database) stored in memory circuitry 212.

In some examples, if no parameter value has been set for either of the image projections parameter and/or frames averaged parameter, the high resolution imaging process 300 may first identify an optimal number of image projections. For example, the optimal number of image projections may be identified using Nyquist theory, the identified level of detail (and/or image quality), the geometric magnification, the quantity and/or size of pixels 404 on the X-ray detector 108, and/or other relevant information. The number of image projections may then be controlled, or recommended, to be equal to (and/or within a threshold range of) the optimal number of image projections. Afterwards, a parameter value for the frames averaged parameter may be controlled, or recommended, as discussed above (where only one needed parameter remains unset).

In some examples, if one of the needed parameters that remains unset (or the only needed parameters that remains unset) is the degrees of rotation parameter, the high resolution imaging process 300 may default to controlling or recommending a parameter value of 360° (or some other default parameter value stored in memory circuitry 212).

In the example of FIG. 3, the high resolution imaging process 300 returns to block 310 after block 312. As shown, the high resolution imaging process 300 proceeds to block 314 after block 312 if sufficient parameter values have been identified to identify a potential starting angle variation.

At block 314, the high resolution imaging process 300 determines the potential starting angle variation based on the identified/needed parameter values and the potential starting angle variation equation (discussed above). In some examples, the high resolution imaging process 300 may use a data structure (e.g., look up table, database) stored in memory circuitry 212 (e.g., that implements the potential starting angle variation equation) rather than the potential starting angle variation equation itself. Once the potential starting angle variation is determined, the high resolution imaging process 300 checks whether the potential starting angle variation is equal to the maximum starting angle variation, or below and within a threshold range of the maximum starting angle variation.

The threshold range requirement (in cooperation with the max) effectively sets a minimum starting angle variation as well as the maximum (to ensure adequate rotation/scan speed). In some examples, the threshold range may be omitted. In the example of FIG. 3, the high resolution imaging process 300 proceeds to block 316 after block 314 if the potential starting angle variation is not equal to the maximum starting angle variation, or below and within the threshold range of the maximum starting angle variation. In some examples, the high resolution imaging process 300 may also output an alert (similar to the below discussed recommendations), notifying the user that the potential starting angle variation is not equal to the maximum starting angle variation, or below and within the threshold range of the maximum starting angle variation.

At block 316, the high resolution imaging process 300 controls, or recommends, one or more parameter values for the geometric magnification, image projections, and/or frames averaged parameters to ensure the potential starting angle variation is equal to the maximum starting angle variation, or below and within the threshold range of the maximum starting angle variation. In some examples, the high resolution imaging process 300 may only control, or recommend one of the parameter values (e.g., the parameter value that was set most recently, the parameter value identified as most malleable in memory or by the user, etc.). In some examples, the high resolution imaging process 300 may only control, or recommend, a different parameter value for the geometric magnification parameter if the maximum starting angle variation is lower than a threshold value (e.g., stored in memory circuitry 212 and/or set via the UI 204), and/or the identified geometric magnification is more than a threshold amount over the default/ideal geometric magnification (discussed above) for a particular level of detail (and/or image quality).

In some examples, the high resolution imaging process 300 may make a recommendation by outputting a message via the output device(s) 208 of the UI 204. In some examples, the high resolution imaging process 300 may output a recommendation in the form of audio, text, image(s), video(s), and/or other appropriate formats. In some examples, the recommendation may notify the user of the parameter, the current parameter value, and/or the issue (e.g., the presently identified parameter value is too high/low and/or causing a too high/low rotation speed, scan time, maximum starting angle variation, and/or potential starting angle variation). In some examples, the recommendation may notify the user of a recommended value, and/or modification direction (e.g., higher/lower value), that would solve the issue. In some examples, the recommendation may notify the user of one or more values to avoid.

In some examples, the high resolution imaging process 300 may control a parameter value directly, such as, for example, by setting a parameter value. In some examples, the high resolution imaging process 300 may control a parameter value indirectly, such as, for example, by prohibiting entry of unsatisfactory parameter values. In some examples, the high resolution imaging process 300 may output a notification to inform a user when, how, and/or why a parameter value was controlled, similar to that which is discussed above with respect to recommendations.

In the example of FIG. 3, the high resolution imaging process 300 returns to block 308 after controlling, or recommending, the parameter value(s) at block 316. As shown, the high resolution imaging process 300 proceeds to block 318 after block 314 if the potential starting angle variation is equal to the maximum starting angle variation, or below and within the threshold range of the maximum starting angle variation. In some examples, the high resolution imaging process 300 only proceeds to block 318 after block 314 if the user selects (e.g., via the UI 204) to start the scanning/imaging process.

At block 318, the high resolution imaging process 300 controls the X-ray emitter 106, X-ray detector 108, detector positioner 150, object positioner 110, and/or rotatable platform 160 to acquire and/or generate several (e.g., 2, 3, 4, 5, 6, 7, 8, etc.) different sets of radiographic images based on the above parameter values. In some examples, each set of radiographic images may be captured and/or generated while the X-ray detector 108 is at a slightly different (e.g., sub-pixely shifted) position and/or the object 102 is being rotated (e.g., via the object positioner 110). In some examples, the size of (and/or number of images in) each set of radiographic images may be equal to the number of image projections multiplied by the number of frames averaged. In some examples, one or more of the radiographic images may be output to the user via the output device(s) 208 of the UI 204 and/or stored in memory circuitry 212.

In the example of FIG. 3, the high resolution imaging process 300 proceeds to block 320 after block 318. At block 320, the high resolution imaging process 300 combines together corresponding image projections (at the same orientation angle of the object 102) of different sets of radiographic images to produce a set of higher-resolution radiographic images, as described above. In some examples, each higher-resolution radiographic image in the set of higher-resolution radiographic images will have a higher resolution than each corresponding (and/or any other) radiographic image(s) in the sets of radiographic images. In some examples, the size of the set of higher-resolution radiographic images is equal to the identified parameter value corresponding to the image projections parameter. In some examples, one or more of the higher-resolution images may be output to the user via the output device(s) 208 of the UI 204 and/or stored in memory circuitry 212.

In the example of FIG. 3, the high resolution imaging process 300 proceeds to block 322 after block 320. At block 322, the high resolution imaging process 300 assembles the higher resolution radiographic images into one or more 3D volumes and/or 3D images. In some examples, the 3D volume may be an image and/or model of the object 102. In some examples, the high resolution imaging process 300 may additionally take one or more particular 2D image slices of the 3D volume (e.g., based on some user selected or stored parameters). In some examples, the 2D image slice(s) may be different than any 2D image previously generated and/or acquired. In some examples, one or more of the 3D images and/or 2D images may be output to the user via the output device(s) 208 of the UI 204 and/or stored in memory circuitry 212.

Figure 6:
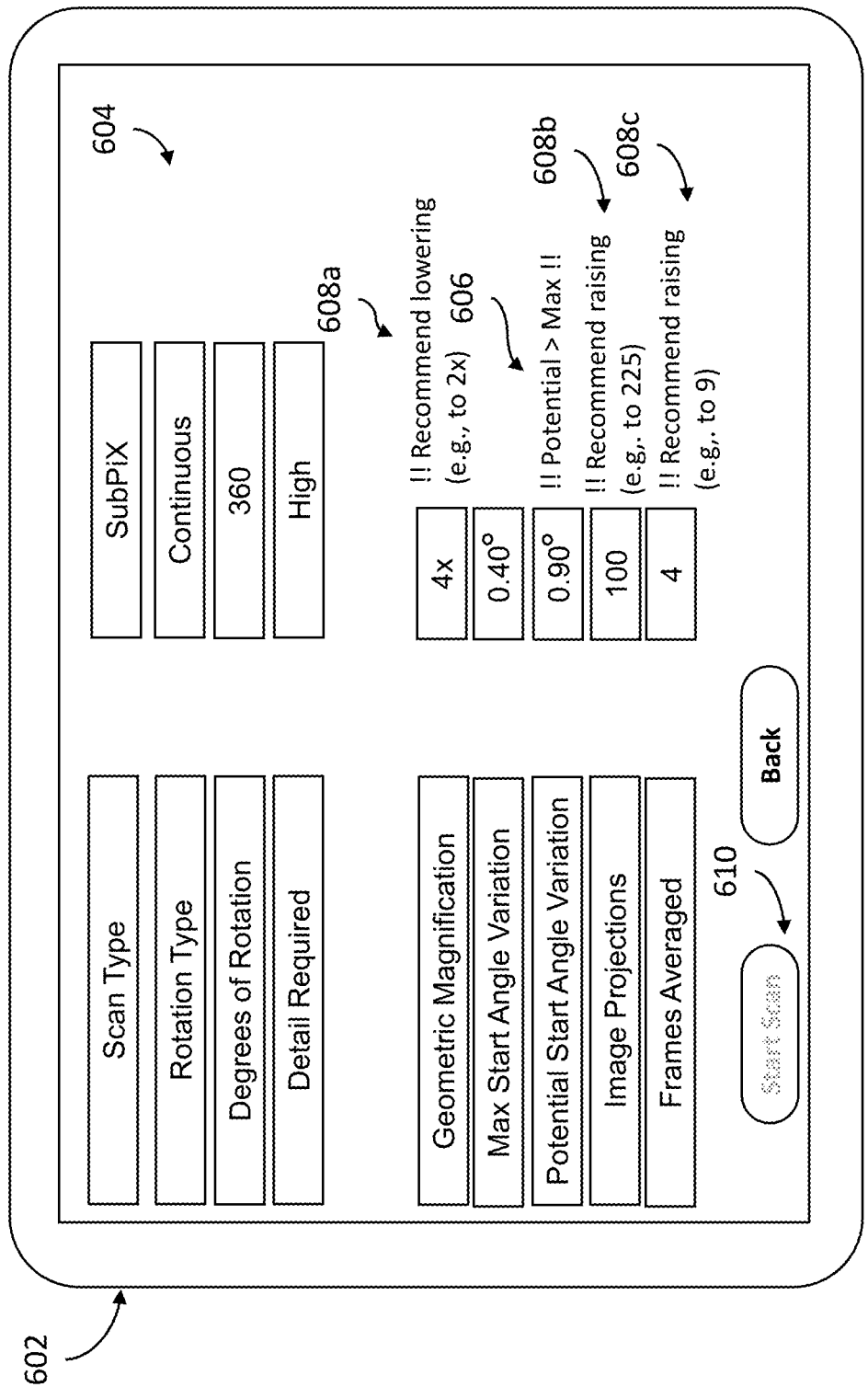
FIG. 6 illustrates an example of a display screen showing various parameters of the high resolution imaging process of FIG. 3, in accordance with aspects of this disclosure.

FIG. 6 is an example of a display screen 602 of the output device(s) 208 of the UI 204 that is outputting a GUI 204 that might, for example, allow a user to set one or more parameters during the high resolution imaging process 300. As shown, the GUI 204 depicts several different parameters on the left, and corresponding parameter values for each parameter in line on the right. In particular, the GUI 204 shows that a high resolution sub-pixel (i.e., SubPix) parameter value has been set for the Scan Type parameter. Additionally, a continuous (as opposed to step) rotation parameter value has been selected for the Rotation Type parameter. The Scan Type and Rotation Type parameter values together may indicate selection of the high resolution imaging process 300. While shown as being two separate parameters and/or parameter values in the example of FIG. 3, in some examples, there may only be one (or more than two) parameter(s) and/or parameter value(s) indicating selection of the high resolution imaging process 300.

In the example of FIG. 6, a High parameter value has been set for the Detail Required parameter, and a 4× parameter value has been set for the Geometric Magnification parameter. From this information, a parameter value of 0.40° has been identified (e.g., by the high resolution imaging process 300) for the Max Starting Angle Variation parameter. However, the GUI 204 also shows a parameter value of 0.90° for the Potential Start Angle Variation parameter, which is above the parameter value of 0.40° for the Max Starting Angle Variation parameter.

Due to the Potential Start Angle Variation parameter value exceeding the Max Starting Angle Variation parameter value, the high resolution imaging process 300 has output an alert 606. As shown, the GUI 604 has also grayed out the start scan button 610, indicating that the button 610 cannot currently be activated to initiate the scan. In some examples, the button 610 may remain inactive until the Potential Start Angle Variation parameter value is equal to the Max Starting Angle Variation parameter value, or below and within a threshold of the Max Starting Variation parameter value.

In the example of FIG. 6, the high resolution imaging process 300 has also output several recommendations 608 on how to fix the issue. In particular, the recommendations 608 are for parameter value changes that might lower the Potential Start Angle Variation parameter value, or raise the Max Starting Angle Variation parameter value, thereby fixing the issue.

For example, the recommendation 608a says to lower the geometric magnification to 2×. In some examples, this lowered geometric magnification might still satisfy the High parameter value for the Detail Required parameter, while also allowing for a sufficiently higher maximum starting angle variation (and/or faster scan) as to fix the issue.

As another example, the recommendation 608b says to raise the image projections parameter value from 100 to 225. As another example, the recommendation 608c says to raise the frames averaged parameter value from 4 to 9. In some examples, such an increase in the image projections parameter value or frames averaged parameter value would result in the Potential Start Angle Variation parameter value being equal to the Max Start Angle Variation parameter value, thereby fixing the issue. While short and simple textual explanations are depicted for the alert 606 and recommendations 608, in some examples, the explanations may be more extensive and/or detailed, and/or include links to more extensive and/or detailed explanations.

By controlling, or recommending, certain parameter values of the high resolution imaging process 300, problems that may arise due to a lack of synchronization may be mitigated. With the problems mitigated, a user may be able to perform a high-resolution scan of an object 102 with increased speed (e.g., due to the continuous rotation) and without the loss of detail and/or blur that normally results due to synchronization issues.

The present methods and/or systems may be realized in hardware, software, or a combination of hardware and software. The present methods and/or systems may be realized in a centralized fashion in at least one computing system, or in a distributed fashion where different elements are spread across several interconnected computing and/or remote computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more instructions (e.g., lines of code) executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As used herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As utilized herein, the terms "e.g.," and "for example" set off lists of one or more non-limiting examples, instances, or illustrations.

As used herein, the terms "coupled," "coupled to," and "coupled with," each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect" means to attach, affix, couple, join, fasten, link, and/or otherwise secure.

As used herein the terms "circuits" and "circuitry" refer to physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, circuitry is "operable" and/or "configured" to perform a function whenever the circuitry comprises the necessary hardware and/or code (if any is necessary) to perform the function, regardless of whether performance of the function is disabled or enabled (e.g., by a user-configurable setting, factory trim, etc.).

As used herein, a control circuit may include digital and/or analog circuitry, discrete and/or integrated circuitry, microprocessors, DSPs, etc., software, hardware and/or firmware, located on one or more boards, that form part or all of a controller, and/or are used to control a welding process, and/or a device such as a power source or wire feeder.

As used herein, the term "processor" means processing devices, apparatus, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC), a graphic processing unit (GPU), a reduced instruction set computer (RISC) processor with an advanced RISC machine (ARM) core, etc. The processor may be coupled to, and/or integrated with a memory device.

As used, herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like. Memory can include, for example, a non-transitory memory, a non-transitory processor readable medium, a non-transitory computer readable medium, non-volatile memory, dynamic RAM (DRAM), volatile memory, ferroelectric RAM (FRAM), first-in-first-out (FIFO) memory, last-in-first-out (LIFO) memory, stack memory, non-volatile RAM (NVRAM), static RAM (SRAM), a cache, a buffer, a semiconductor memory, a magnetic memory, an optical memory, a flash memory, a flash card, a compact flash card, memory cards, secure digital memory cards, a microcard, a minicard, an expansion card, a smart card, a memory stick, a multimedia card, a picture card, flash storage, a subscriber identity module (SIM) card, a hard drive (HDD), a solid state drive (SSD), etc. The memory can be configured to store code, instructions, applications, software, firmware and/or data, and may be external, internal, or both with respect to the processor.

What is claimed is:

1. A non-transitory computer readable medium comprising machine readable instructions which, when executed by processing circuitry, causes the processing circuitry to:
    receive, via an input device of a user interface, a selection of a continuous high resolution image acquisition process, the continuous high resolution image acquisition process being a process by which an industrial radiography imaging system acquires radiographic images of an object at a plurality of different detector positions of a radiation detector while the object is being rotated;
    in response to the selection, identify a maximum starting angle variation,
    the maximum starting angle variation comprising a maximum tolerable difference between an orientation of the object when a first initial image is acquired and the orientation of the object when a second initial image is acquired during the high resolution image acquisition process,
    the maximum starting angle variation being identified based on a geometric magnification of the industrial radiography imaging system or an image quality necessary for a particular application of the industrial radiography imaging system, the geometric magnification comprising a first distance from a radiation emitter to the radiation detector divided by a second distance from the radiation emitter to the object,
    the first initial image being acquired when the radiation detector is at a first detector position during the high resolution image acquisition process, and the second initial image being acquired when the radiation detector is at a second detector position during the high resolution image acquisition process;
    set, or recommend, at least one of a first parameter value of a first parameter to be a first value, or a second parameter value of a second parameter to be a second value, based on the maximum starting angle variation; and
    execute the high resolution image acquisition process based on the first parameter value and the second parameter value to generate an image of the object.

2. The non-transitory computer readable medium of claim 1, wherein the first parameter comprises a number of image projections and the second parameter comprises a number of image frames averaged together for one image projection.

3. The non-transitory computer readable medium of claim 2, further comprising machine readable instructions for the high resolution image acquisition process which, when executed by the processing circuitry, cause the processing circuitry to:
    generate, while the radiation detector is at the first detector position, a first set of radiographic images based on radiation detected by the radiation detector while a rotatable fixture rotates the object through a first revolution;

generate, while the radiation detector is at the second detector position, a second set of radiographic images based on radiation detected by the radiation detector while the rotatable fixture rotates the object through a second revolution; and produce a third set of higher-resolution radiographic images based on radiographic images in the first set of radiographic images and corresponding radiographs in the second set of radiographic images, the higher-resolution radiographic images having higher resolution than the radiographic images in the first set of radiographs and the corresponding radiographic images in the second set of radiographs, wherein a size of the first set, second set, or third set of radiographic images is dependent on the first parameter value of the first parameter or the second parameter value of the second parameter.

4. The non-transitory computer readable medium of claim 3, further comprising machine readable instructions for the high resolution image acquisition process which, when executed by the processing circuitry, cause the processing circuitry to: assemble the third set of higher-resolution radiographic images into the image of the object, the image of the object comprising data representative of a two-dimensional (2D) image, data representative of a three-dimensional (3D) volume, or data representative of a 2D slice of the 3D volume.

5. The non-transitory computer readable medium of claim 3, wherein the size of the first set and the second set of radiographic images is equal to the first parameter value multiplied by the second parameter value, and the size of the third set is equal to the first parameter value.

6. The non-transitory computer readable medium of claim 3, wherein setting, or recommending, at least one of the first parameter value of the first parameter to be the first value, or the second parameter value of the second parameter to be the second value, based on the maximum starting angle variation comprises:

determining one or more first values of the first parameter or second values of the second parameter that could result in a starting angle variation that exceeds the maximum starting angle variation, the starting angle variation comprising a difference in the orientation of the object when the first initial image of the first set of radiographic images is acquired by the radiation detector during the first revolution of the object, and the orientation of the object when a second initial image of the second set of radiographic images is acquired by the radiation detector during the second revolution of the object, and prohibiting input or selection, or recommending against input or selection, of the one or more first values of the first parameter or second values of the second parameter.

7. The non-transitory computer readable medium of claim 6, wherein setting, or recommending, at least one of the first parameter value of the first parameter to be the first value, or the second parameter value of the second parameter to be the second value, based on the maximum starting angle variation further comprises automatically setting at least one of the first parameter value or the second parameter value such that the starting angle variation will not exceed the maximum starting angle variation.

8. The non-transitory computer readable medium of claim 3, wherein the first detector position is offset from the second detector position by less than a pixel size of the radiation detector.

9. The non-transitory computer readable medium of claim 1, further comprising machine readable instructions which, when executed by the processing circuitry, cause the processing circuitry to: display the image on a display screen.

10. An industrial radiography imaging system, comprising:

a radiation emitter configured to emit radiation;

a radiation detector configured to detect radiation emitted by the radiation emitter;

a rotatable fixture configured to retain and rotate an object, the rotatable fixture being positioned between the radiation emitter and radiation detector;

a detector positioner configured to move the radiation detector to a plurality of different detector positions; and an image acquisition system configured to generate an image of the object based on radiation detected by the radiation detector after passing through the object, the image acquisition system comprising:

a user interface comprising an input device, processing circuitry, and memory circuitry comprising machine readable instructions which, when executed by the processing circuitry, cause the processing circuitry to:

receive, via the input device, a selection of a continuous high resolution image acquisition process, the continuous high resolution image acquisition process comprising a process by which the industrial radiography imaging system acquires images at the plurality of different detector positions while the object is being rotated, in response to the selection, identify a maximum starting angle variation, the maximum starting angle variation comprising a maximum tolerable difference between an orientation of the object when a first initial image is acquired and the orientation of the object when a second initial image is acquired during the high resolution image acquisition process, the maximum starting angle variation being identified based on a geometric magnification of the industrial radiography imaging system or an image quality necessary for a particular application of the industrial radiography imaging system, the geometric magnification comprising a first distance from a radiation emitter to the radiation detector divided by a second distance from the radiation emitter to the object, the first initial image being acquired when the radiation detector is at a first detector position during the high resolution image acquisition process, and the second initial image being acquired when the radiation detector is at a second detector position during the high resolution image acquisition process, set, or recommend, at least one of a first parameter value of a first parameter to be a first value, or a second parameter value of a second parameter to be a second value, based on the maximum starting angle variation, and execute the high resolution image acquisition process based on the first parameter value and the second parameter value to generate the image of the object.

11. The system of claim 10, wherein the first parameter comprises a number of image projections and the second parameter comprises a number of image frames averaged together for one image projection.

12. The system of claim 11, wherein the memory circuitry further comprises machine readable instructions for the high resolution image acquisition process which, when executed by the processing circuitry, cause the processing circuitry to:
generate, while the radiation detector is at the first detector position, a first set of radiographic images based on radiation detected by the radiation detector while the rotatable fixture rotates the object through a first revolution,
generate, while the radiation detector is at the second detector position, a second set of radiographic images based on radiation detected by the radiation detector while the rotatable fixture rotates the object through a second revolution, and
produce a third set of higher-resolution radiographic images based on radiographic images in the first set of radiographic images and corresponding radiographs in the second set of radiographic images, the higher-resolution radiographic images having higher resolution than the radiographic images in the first set of radiographs and the corresponding radiographic images in the second set of radiographs,
wherein a size of the first set, second set, or third set of radiographic images is based on the first value of the first parameter or the second value of the second parameter.

13. The system of claim 12, wherein the memory circuitry comprises machine readable instructions for the high resolution image acquisition process which, when executed by the processing circuitry, further cause the processing circuitry to: assemble the third set of higher-resolution radiographic images into the image of the object, the image of the object comprising data representative of a two-dimensional (2D) image, data representative of a three-dimensional (3D) volume, or data representative of a 2D slice of the 3D volume.

14. The system of claim 12, wherein the size of the first set and the second set of radiographic images is equal to the first parameter value multiplied by the second parameter value, and the size of the third set is equal to the first parameter value.

15. The system of claim 12, wherein setting, or recommending, at least one of the first parameter value of the first parameter to be the first value, or the second parameter value of the second parameter to be the second value, based on the maximum starting angle variation comprises:
determining one or more first values of the first parameter or second values of the second parameter that could result in a starting angle variation that exceeds the maximum starting angle variation,
the starting angle variation comprising a difference in the orientation of the object when the first initial image of the first set of radiographic images is acquired by the radiation detector during the first revolution of the object, and the orientation of the object when a second initial image of the second set of radiographic images is acquired by the radiation detector during the second revolution of the object, and
prohibiting input or selection, or recommending against input or selection, of the one or more first values of the first parameter or second values of the second parameter.

16. The system of claim 15, wherein setting, or recommending, at least one of the first parameter value of the first parameter to be the first value, or the second parameter value of the second parameter to be the second value, based on the maximum starting angle variation further comprises automatically setting at least one of the first parameter value or the second parameter value such that the starting angle variation will not exceed the maximum starting angle variation.

17. The system of claim 12, wherein the first detector position is offset from the second detector position by less than a pixel size of the radiation detector.

18. The system of claim 10, wherein the memory circuitry further comprises machine readable instructions which, when executed by the processing circuitry, causes the processing circuitry to: display the image of the object on a display screen of the user interface.

* * * * *